(12) United States Patent
Stewart

(10) Patent No.: US 7,377,411 B1
(45) Date of Patent: May 27, 2008

(54) ADJUSTABLE BRIEFCASE SUPPORT DEVICE

(76) Inventor: Abbott Stewart, 151 Carroll Loop, Spearsville, LA (US) 71277

( * ) Notice: Subject to any disclaimer, the term of this patent is extended or adjusted under 35 U.S.C. 154(b) by 467 days.

(21) Appl. No.: 10/768,552

(22) Filed: Feb. 2, 2004

(51) Int. Cl.
*B60R 7/00* (2006.01)
*B65D 25/52* (2006.01)
*A45F 4/00* (2006.01)

(52) U.S. Cl. ............ 224/275; 224/42.43; 224/42.46 B; 224/197; 224/585

(58) Field of Classification Search .............. 224/275, 224/270, 407
See application file for complete search history.

(56) References Cited

U.S. PATENT DOCUMENTS

| 367,996 | A | * | 8/1887 | Nathan ................. 224/677 |
| 2,767,895 | A | * | 10/1956 | Smith .................. 224/275 |
| 3,175,743 | A | * | 3/1965 | Richard ................ 224/549 |
| 3,386,392 | A | | 6/1968 | Gramm |
| 3,828,994 | A | | 8/1974 | Hollins |
| 3,951,486 | A | | 4/1976 | Tracy |
| 3,986,649 | A | * | 10/1976 | Heimstra ............... 224/567 |
| 4,946,120 | A | | 8/1990 | Hatcher |
| D324,953 | S | | 3/1992 | Swanner |
| 5,170,903 | A | * | 12/1992 | Fleming ............... 220/87.2 |
| 5,294,026 | A | * | 3/1994 | McGirt ................ 224/549 |
| 5,573,158 | A | * | 11/1996 | Penn .................. 224/265 |
| 5,752,719 | A | | 5/1998 | Mitschelen et al. |
| 6,401,983 | B1 | * | 6/2002 | McDonald et al. ...... 222/181.2 |
| 6,502,900 | B1 | | 1/2003 | Johnston |
| 6,607,088 | B2 | * | 8/2003 | Cestrone ............. 220/23.86 |
| 6,763,986 | B2 | * | 7/2004 | Santos et al. ........... 224/585 |
| 2001/0011664 | A1 | | 8/2001 | Merritt |
| 2003/0194152 | A1 | * | 10/2003 | Peska ................... 383/40 |
| 2004/0090047 | A1 | * | 5/2004 | Kang et al. ............ 280/652 |

* cited by examiner

*Primary Examiner*—Nathan J. Newhouse
*Assistant Examiner*—Lester L Vanterpool

(57) ABSTRACT

An adjustable briefcase support device includes a body defining a receiving section and an upper frame connected thereto. The device further includes a plurality of elongated support members connected to the receiving section and are positioned rearward thereof. Such a plurality of support members extend substantially perpendicularly to the axis and have opposed end portions extending above the upper frame and below the body respectively. The plurality of support members are removably engageable with a vehicle seat for maintaining the receiving section at a substantially stable position during operating conditions. The upper frame includes female and male portions slidably engageable therewith and for selectively adjusting the top opening of the body so that various sized objects can be stored therein.

1 Claim, 5 Drawing Sheets

ADJUSTABLE BRIEFCASE SUPPORT DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to briefcase holders and, more particularly, to an adjustable briefcase support device for holding briefcases in automobiles.

2. Prior Art

As a necessary adjunct to their job, many people today spend a large portion of their working hours riding in or driving automobiles, trucks, and other vehicles. Salesmen, business representatives and executives, for example, may spend a substantial part of their time traveling from one place of business to another, attending meetings, calling on customers, and the like. Such people tend to accumulate many documents in their field of work therefore needing a briefcase. Having so, briefcases are generally too large to occupy storage areas such as glove compartments or middle consoles. Therefore, such objects undoubtedly occupy the seats, dashboard and floor of the vehicle. Such occupancies can create a real danger to the driver and passengers in the vehicle in the case of sudden stops or turns, in addition to being unsightly and inconvenient.

Further, papers and other articles strewn about the vehicle are difficult to locate, often sliding out of reach when the vehicle is in motion and this results in lost time when the material is to be located, and can divert the driver's attention from the road. Such a storage device should be readily accessible by a driver and should provide room for organized storage of the papers and other articles often carried in vehicles. Such a storage device must be securely mounted so as to avoid danger, must be conveniently located to the driver or passenger, should be easily removable, and should provide storage facilities for a variety of differently sized and shaped articles.

Accordingly, a need remains for an adjustable briefcase support device for support and placements of briefcases and the like in automobiles.

BRIEF SUMMARY OF THE INVENTION

In view of the foregoing background, it is therefore an object of the present invention to provide a device for safely and conveniently storing briefcases in automobiles. These and other objects, features, and advantages of the invention are provided by an adjustable briefcase support device including a receiving section including a body having a top opening for selectively receiving a briefcase therein. The body is preferably formed from mesh material for allowing a user to see a briefcase positioned therein. The receiving section preferably includes an upper frame connected to the body and defines a substantially resilient shape about a longitudinal axis thereof. The upper frame is preferably formed from elastic material so that the top opening can be selectively stretched as desired by a user. Advantageously, the upper frame preferably includes a female portion and a male portion slidably engageable therein and for selectively adjusting a size of the body, so that various shaped briefcases can be firmly maintained therein.

The device further includes a plurality of elongated support members connected to the receiving section and positioned rearward thereof. Such a plurality of support members extend substantially perpendicular to the axis and have opposed end portions extending above the upper frame and below the body respectively. The plurality of support members are removably engageable with a vehicle seat for maintaining the receiving section at a substantially stable position during operating conditions.

The plurality of support members include female and male portions slidably engageable therewith for adjusting a length of the plurality of support members respectively. Such female and male end portions preferably have substantially arcuate shapes for hooking onto a vehicle seat and for maintaining the device engaged with a vehicle seat. A plurality of rivets have opposed end portions secured to the plurality of support members and the upper frame respectively and for securing same to the plurality of support members. The present invention may further include a plurality of rubber covers disposed over the opposed end portions of the plurality of support members.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
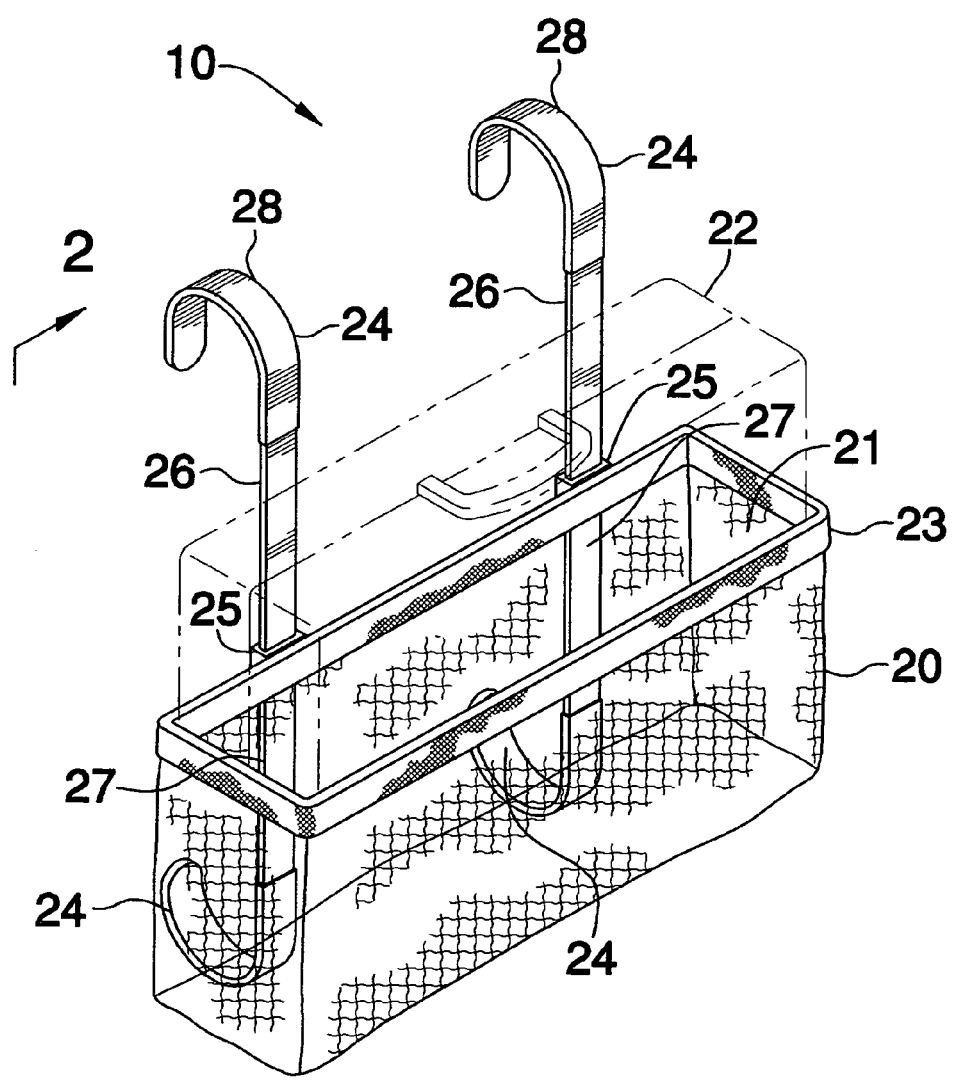
FIG. 1 is a perspective view showing an adjustable briefcase support device, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements and prime numbers refer to alternate elements throughout the figures.

The device of this invention is referred to generally in FIGS. 1-6 by the reference numeral 10 and is intended to provide an adjustable briefcase support device for automobiles. It should be understood that the device 10 may be used to support many different objects and should not be limited to briefcases.

Figure 2:
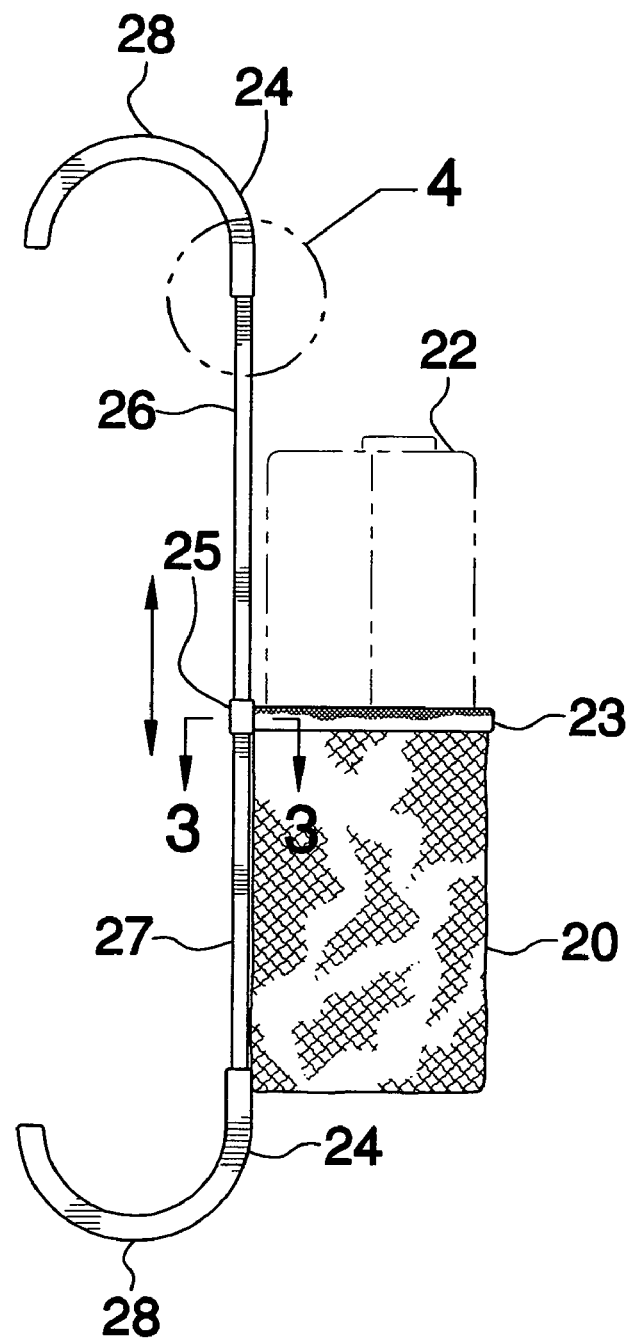
FIG. 2 is a side elevational view of the device shown in FIG. 1.

Referring initially to FIGS. 1 and 2, the device 10 includes a body 20 having a receiving section 21 having a top opening 21 for selectively receiving a briefcase 22 therein. Such a body 20 is preferably formed from mesh material for allowing a user to see a briefcase 22 positioned therein. The receiving section 21 includes an upper frame 23 connected to the body 20 and defines a substantially resilient shape about its longitudinal axis (not shown). Such an upper frame 23 is preferably formed from elastic material so that the top opening can be selectively stretched as desired by a user. The device further includes a plurality of elongated support members 25 connected to the upper frame 23 and are positioned rearward thereof.

Figure 3:
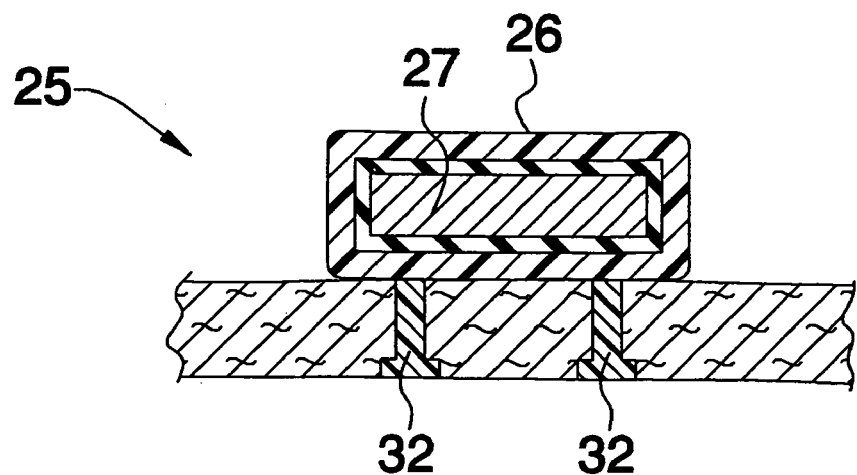
FIG. 3 is an enlarged cross-sectional view of the device shown in FIG. 2, taken along line 3-3.
Figure 4:
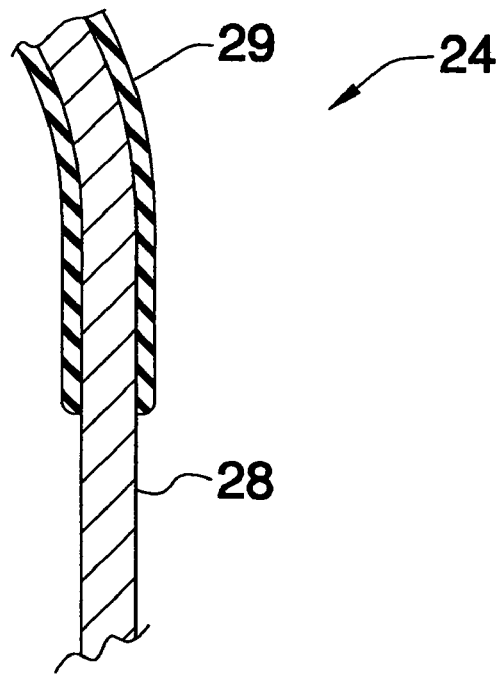
FIG. 4 is an enlarged cross-sectional view of the device shown in FIG. 2.

Referring to FIG. 3, a plurality of rivets 32 having opposed end portions 24 are secured to the plurality of support members 25 and the upper frame 23 respectively. The plurality of support members 25 extend substantially perpendicular to the axis and have opposed end portions 24 extending above the upper frame 23 and below the body 20 respectively. Such end portions 24 include substantially arcuate shapes 28 for hooking onto a vehicle seat and for maintaining the device engaged with a vehicle seat (not shown), as perhaps best shown in FIG. 2.

Referring back to FIG. 3, the plurality of support members 25 include female 26 and male portions 27 slidably engageable therewith for adjusting a length of the plurality of support members 25 respectively, as best shown in FIG. 3. Advantageously, the plurality of support members 25 can be removably engaged with a vehicle seat for maintaining the receiving section 21 at a substantially stable position during operating conditions. Furthermore, the device may include a plurality of rubber covers 29 disposed over the opposed end 28 portions of the plurality of support members 25.

Figure 5:
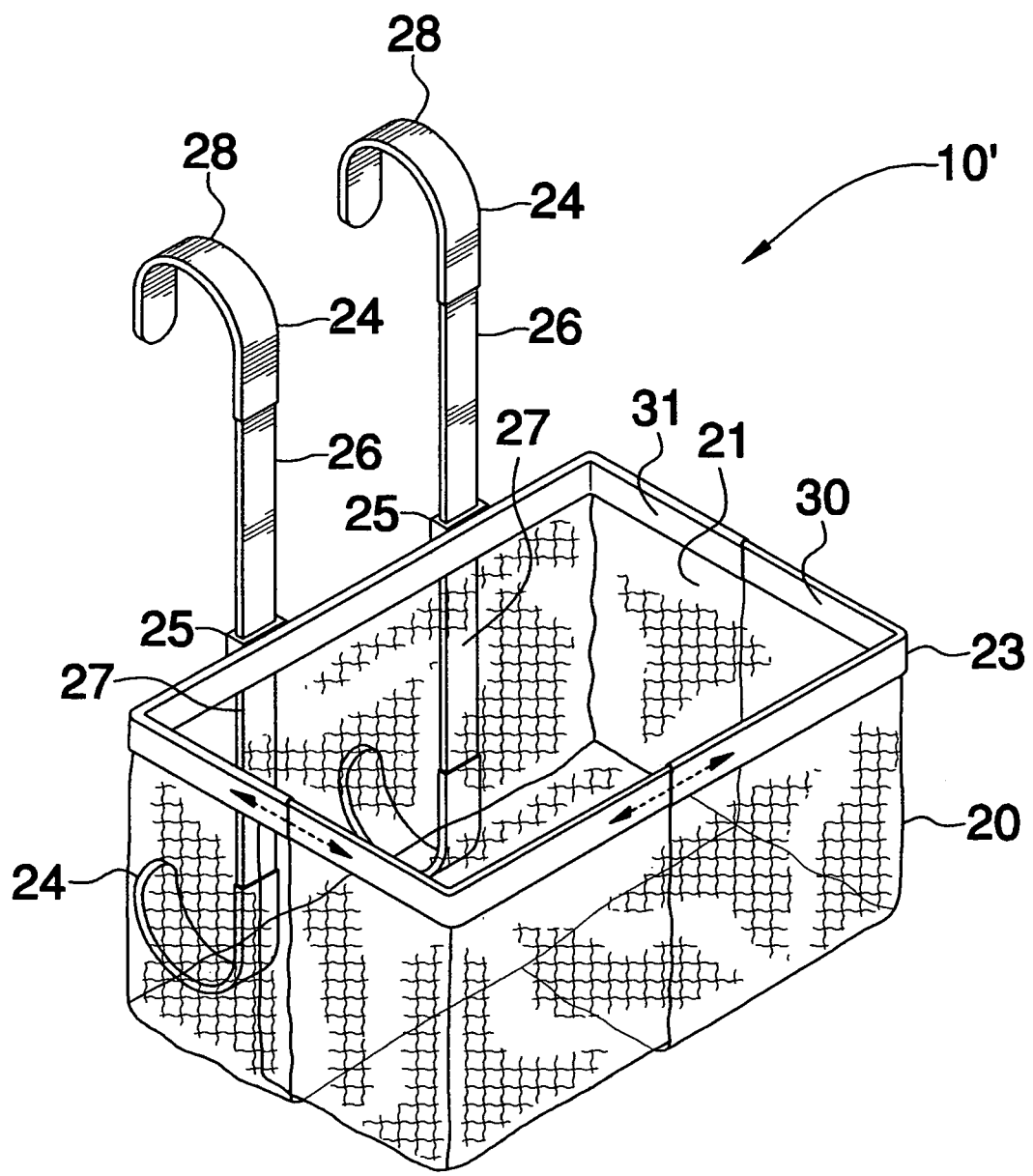
FIG. 5 is a perspective view showing the present invention at an expanded position.
Figure 6:
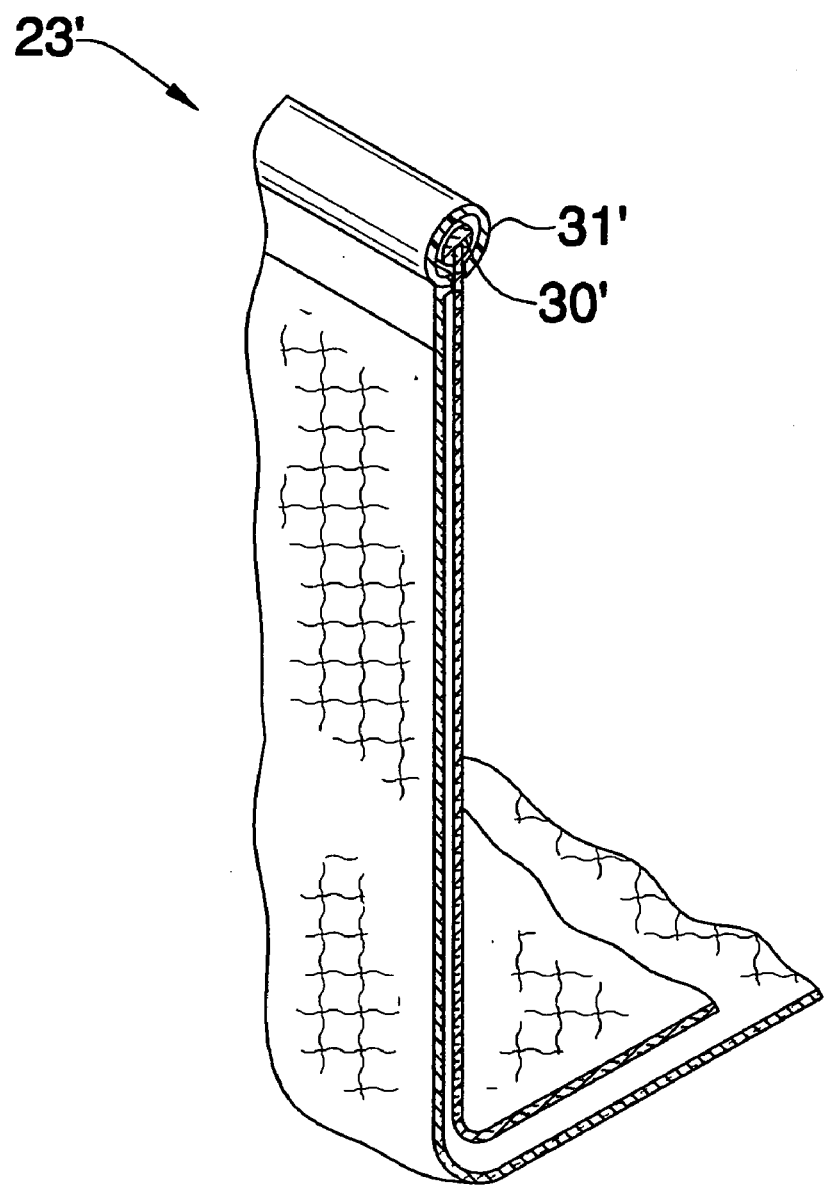
FIG. 6 is a partial perspective view showing an alternate embodiment of the body.

Now referring to FIGS. 5 and 6, the upper frame 23 preferably includes a female portion 31 and a male portion 30 slidably engageable therein and for selectively adjusting a size of the body 20. Such female and male portions 31, 30 may be formed to have rectangular or annular shapes, as clearly shown in FIGS. 5 and 6, respectively. Of course, the female and male portions 31, 30 may have alternate shapes, as well known to a person of ordinary skill in the art.

Businessman and people alike will find that the present invention 10 will provide a safe and efficient way for storing briefcases in automobiles. The support device 10 also provides a convenient way for the driver to open the briefcase without fear of having the contents inside spilling out onto the floor. Of course, the support device can also be used for holding other items of different shapes and sizes, as noted above.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A device for supporting a briefcase adjacent a vehicle seat, said device comprising:

a receiving section including a body having a top opening for selectively receiving a briefcase therein, said receiving section further including an upper frame connected to said body and defining a substantially resilient shape, said receiving section having a longitudinal axis, said upper frame being formed from elastic material so that said top opening can be selectively stretched as desired by a user; and a plurality of elongated support members connected to said receiving section and being positioned rearward thereof, said plurality of support members extending substantially perpendicularly to the axis and having opposed end portions extending above said upper frame and below said body respectively, said plurality of support members being removably engageable with a vehicle seat and for maintaining said receiving section at a substantially stable position during operating conditions, said opposed end portions of said plurality of support members have substantially arcuate shapes for hooking onto a vehicle seat and for maintaining said device engaged with a vehicle seat;

wherein said plurality of support members comprise a plurality of female portions and a plurality of male portions slidably engageable therewith for adjusting a length of said plurality of support members respectively;

a plurality of rivets having opposed end portions secured to said plurality of support members and said upper frame respectively;

a plurality of rubber covers disposed over said opposed end portions of said plurality of support members;

where said elastic upper frame comprises an elastic female portion and an elastic male portion slidably engageable therein and for selectively adjusting a size of said body, said body being formed from mesh material for allowing a user to see a briefcase positioned therein and attached to the male and female portions of the elastic upper frame; where said upper frame is simultaneously expandable and compressible along a longitudinal length and a latitudinal length of said body.

* * * * *